March 9, 1937.  J. D. MORGAN ET AL  2,073,249
REGULATION OF COMBUSTION
Filed Sept. 11, 1933   2 Sheets-Sheet 1
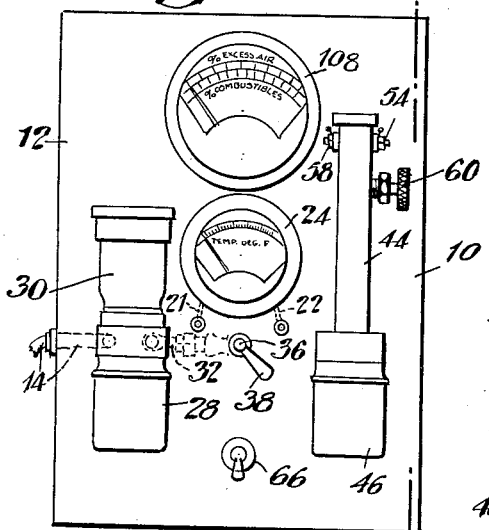
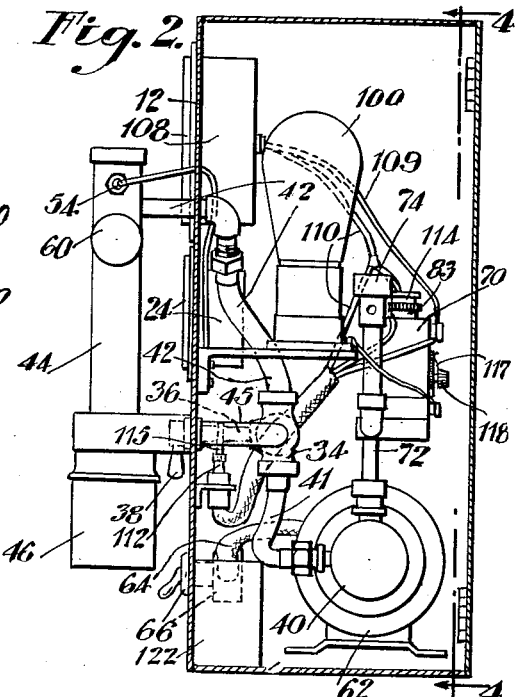
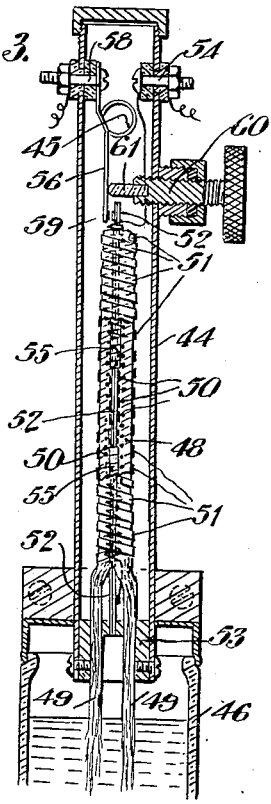
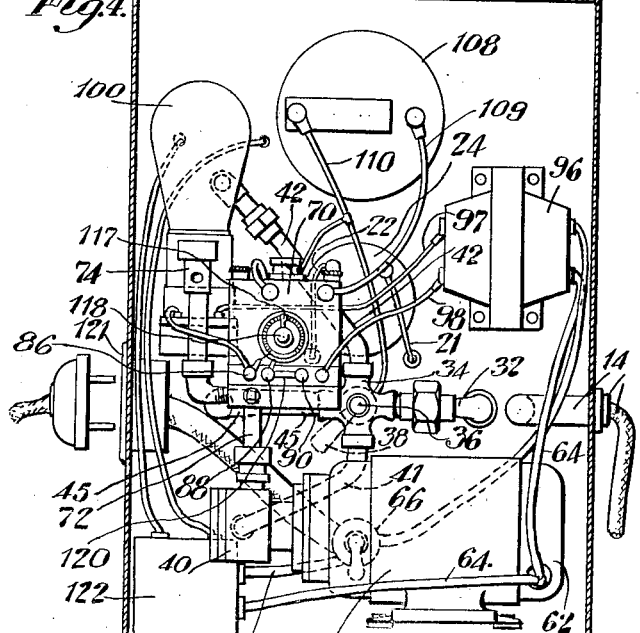
INVENTORS
JOHN D. MORGAN
ALAN P. SULLIVAN
BY Edmund G. Borden ATTORNEY

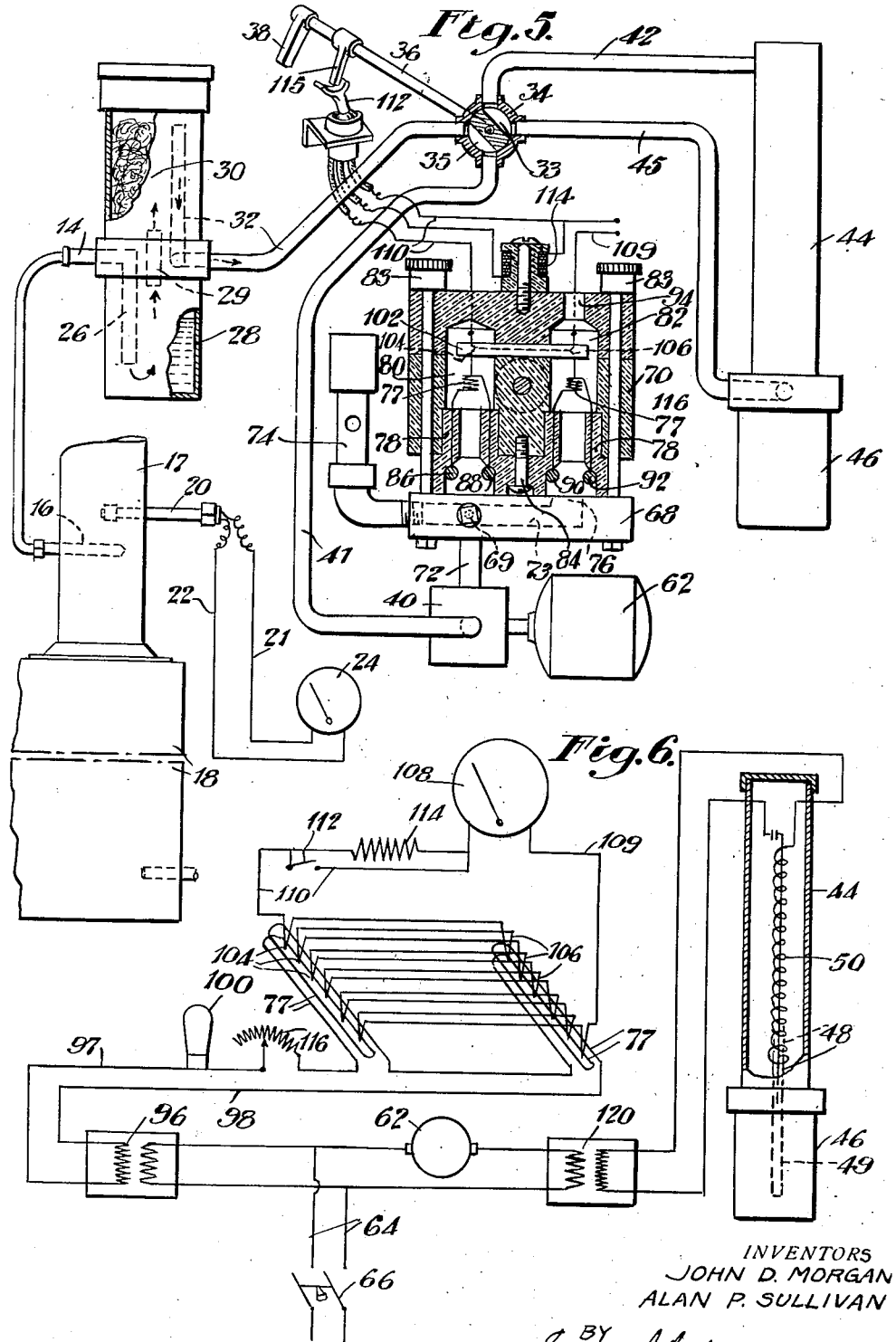

Patented Mar. 9, 1937

2,073,249

UNITED STATES PATENT OFFICE 2,073,249

REGULATION OF COMBUSTION

John D. Morgan, South Orange, N. J., and Alan P. Sullivan, Long Island City, N. Y., assignors to Doherty Research Company, New York, N. Y., a corporation of Delaware Application September 11, 1933, Serial No. 688,972

9 Claims. (Cl. 23—232)

This invention relates to the regulation of combustion of fuel, and more particularly to method and means for checking the operating efficiency of domestic space heating furnaces and Diesel engines by examination of the temperature and composition of gaseous products of combustion produced therein.

The combustion and heat transfer sections of domestic space heating furnaces and the burners employed therein, vary so widely in shape, design, capacity and operating efficiency, that it is a difficult problem to devise method and apparatus which will be universally applicable for adjusting all such furnaces to a condition of optimum operating efficiency with regard to the particular furnace, burner and fuel under test.

The primary operating factor determining the heat transfer efficiency of a furnace of this general type is that of the temperature of the flue gases leaving the furnace. If the heat conductant diaphragms which separate the heating gases and the fluid being heated are clean, and if the heat transfer section of the furnace is properly designed and provided with suitable baffles, it is sometimes possible to operate a well designed furnace at close to maximum load while holding the temperature of the outgoing flue gases below 400° F. However as a general rule domestic heating furnaces cannot be operated at close to maximum heating load without having the outgoing flue gas temperature rise to a point considerably above 400° F.

The condition of optimum operating efficiency for a particular furnace burning a particular fuel is best determined, after thoroughly cleaning the furnace, by making substantially simultaneous measurements of the factors of flue gas temperature and of the amounts of unburned combustible and excess air in the flue gas at several points on the load curve of the furnace between high and low heat demand. The operation of such furnace should be regulated by adjustment of the burners and dampers to proportion the fuel and air supplies so that the temperature of the outgoing flue gas is as low as possible with the furnace set at normal operating condition to meet an average heat demand.

Because of the small cross section and short length of the combustion chamber in the average domestic heating furnace, and because of the relatively low maximum operating temperature developed therein, such furnace normally operates best under a condition of over-ventilation wherein the products of combustion leaving the furnace may contain small amounts, say up to two or two and one-half per cent unburned combustible as a maximum, together with a considerable amount of excess air. The same thing is true in general with respect to Diesel engines.

The primary object of the present invention is to provide method and apparatus particularly adapted for checking combustion and heating operations in connection with the regulation of space heating furnaces and Diesel engines to an optimum operating condition.

Another more specific object of the invention is to provide method and apparatus whereby even an unskilled operator can secure accurate information of the temperature and composition of gaseous products of combustion having both excess air and unburned combustible components.

The flue gas produced in domestic heating furnaces and Diesel engines normally carries sufficient excess air to react with any unburned combustible present in the gas. However, it is necessary to add additional combustible to the flue gas whenever it is desired to quantitatively analyze the gas by combustion for the purpose of ascertaining the amount of excess air. A combustion analyzer which is suitably calibrated for accurately measuring small amounts (say under 2½ per cent) of unburned combustible in flue gas, cannot normally be used without recalibration for measuring large amounts (say up to 100 per cent) of excess air. This is because of the wide variation of temperature developed in burning small amounts of unburned combustible on the one hand, and in burning large volumes of excess air on the other, and because it is difficult to calibrate such instruments to record accurately over a wide range of temperature.

Research investigation further shows that when a combustion analyzer is to be used for measuring both small amounts of unburned combustible components as well as large amounts of excess air in gaseous products of combustion, great care must be exercised in choosing the type of fuel which is added to the flue gas for reaction with the excess air in the combustion chamber of the analyzer. Hydrocarbon fuels are in general unsatisfactory for this purpose because of their high calorific value and because they develop such high temperatures on combustion that cracking reactions generally occur, with resultant formation of carbon and erroneous readings for excess air caused by incomplete combustion reactions and waste of part of the heat developed in promoting secondary endothermic reactions. Gases such as hydrogen are also unsatisfactory for use in analyzing for excess air because erroneous and fluctuating readings are obtained apparently as a result of occlusion of the hydrogen in the pores of the metal parts of the analyzer and the catalyst. Oxidized hydrocarbons of low calorific value such as methanol can be used satisfactorily for analyzing amounts of excess air in the flue gas under 50 per cent by volume, but erroneous readings may be obtained when using methanol to burn out amounts of excess air exceeding about 50 per cent volume of the flue gas, apparently due to the low vapor pressure and relatively low calorific value of methanol, and the tendency to form formaldehyde rather than $CO_2$ and $H_2O$.

Another object of the present invention is to provide method and means which shall be operative for quantitatively analyzing flue gases by combustion both for low percentages of unburned combustible and for large percentages of excess oxygen or air.

An important feature of the invention resides in the method and apparatus provided for introducing into a sample stream of flue gas to be analyzed by combustion for up to 100 per cent excess air, a regulated supply of vaporized fuel of substantially constant heating value and burning characteristics whereby the air can be burned to form products of complete combustion without developing temperatures outside the measuring range of an analyzer calibrated for quantitative combustion analysis of under 2.5 per cent combustible in the blue gas.

In its broadest scope the invention involves the continuous measurement of the temperature of flue gas at the point at which it leaves a combustion chamber, and the continuous removal of a uniform sample of the gas at the point of temperature measurement and its quantitative analysis by combustion first,—after carburetion with a regulated amount of vapor of a liquid hydrocarbon oxygen fuel having a calorific value in the range 5600–7600 gram-calories per gram for excess air; and secondly,—in undiluted form or when necessary after dilution with air,— for unburned combustible. The invention contemplates carrying out the analysis in a modified form of catalyst heating and multiple thermocouple measuring type analyzer such as that described in the copending application of John D. Morgan S. N. 651,893, filed January 16, 1933. The invention contemplates taking such temperature measurements and alternative measurements of unburned combustible and excess oxygen in furnace flue gas while operating the furnace to meet varying conditions of heat demand; and adjustment of the furnace dampers and fuel burners to give as low an outgoing flue gas temperature as possible while burning fuel in amount sufficient to meet the normal or average heat demand on the furnace.

The invention will now be more particularly described in connection with the accompanying drawings illustrating apparatus embodying a preferred form of the invention, wherein:

Fig. 1 is a front elevation of a portable gas analyzer unit;

Fig. 2 is a vertical section of the analyzer, taken along line 2—2 of Fig. 1;

Fig. 3 is a vertical section through the wick vaporizer element shown in Fig. 1;

Fig. 4 is a rear vertical section taken along line 4—4 of Fig. 2;

Fig. 5 is a diagrammatic view of the analyzer assembly including a vertical section of the analyzer cell; and Fig. 6 is a wiring diagram.

Fig. 5 of the drawings illustrates application of the invention to the regulation of a domestic type heating furnace but it will be readily understood that the invention is equally applicable to regulation of operation of Diesel engines and similar combustion units.

Referring to the drawings, numeral 10 designates a ventilated portable container or box, preferably of sheet metal, having a hinged front door 12 which serves as an instrument panel. For securing a continuous sample of the furnace flue gas to be analyzed, a suitable gas sampling tube 14 is provided having an apertured gas sampling nozzle 16 at its free end adapted for introduction into the waste gas flue 17 of a furnace 18 (Fig. 5). A thermocouple 20 is mounted in flue 17 adjacent gas sampler 16, with lead wires 21, 22 connecting it to a galvanometer 24 mounted on panel 12. Thermocouple 20 with its indicating galvanometer gives a continuous reading of the temperature in flue 17 at the point where the flue gas sample is taken. The discharge end of sampling tube 14 opens through an L fitting 26 into the bottom of a liquid scrubbing bath 28 mounted on the front of the instrument panel. Scrubber 28 is in permanent communication through a metal tube 29 with a gas filter and liquid separator 30. The filter 30 is preferably filled with cotton, glass wool or other dry filtering material, while the scrubber 28 is preferably filled with water. A tube 32 communicably connects filter 30 with a four-way valve 34 having a stem 36 which is rotatable through a 90° angle by a change-over lever 38 mounted on the instrument panel.

With the four-way valve 34 set in the position shown in Fig. 5 for analyzing for "combustible", the sample of flue gas passes from filter 30 and tube 32 through valve orifice 35, and thence directly to the inlet port of a pump 40 through a tube 41. With the valve 34 turned clockwise 90° from the position shown in Fig. 5 to a new position (not shown) for analyzing for "excess air", the sample of flue gas passes from filter 30 and tube 32 through valve orifice 35 and a conduit 42 into the top of a thermostatically controlled wick vaporizer 44 which is mounted on the right hand side of the panel 12. In flowing downwardly through vaporizer 44 the gas sample is carburetted by admixture therewith of liquid fuel vapors, and from the bottom of the vaporizer the flue gas-fuel vapor mixture returns to the four-way valve 34 through a pipe 45, and is thence passed through valve orifice 33 into tube 41 and therethrough to the inlet of pump 40.

The vaporizer 44 is mounted over a liquid fuel reservoir 46 from which liquid is elevated into the vaporizer by a wick 48 (Fig. 3). An electric resistance heating coil 50 extends coaxially within that part of wick 48 which extends up centrally through the vaporizer, and the wick is supported in the vaporizer by a metal ribbon 51 and by a bimetallic strip 52 which is pivotally supported coaxially of the vaporizer and coil 50 by an apertured plug closure 53 at the base of the vaporizer. Ribbon 51 limits the area of wick 48 which is contacted by the gas stream flowing through the vaporizer. The wick is wrapped around strip 52 and its lower ends 49 extend through apertures in plug 53 to a point below the level of liquid fuel in reservoir 46. One end of coil 50 is connected to a terminal post 54 located at the upper end of vaporizer 44, and the other end of coil 50 is connected to strip 52. An insulating wrapping 55 separates strips 52 and coil 50 except at the point of connection. Bimetallic strip 52 forms one contact element of a thermostatic switch of which a spring metal strip 56 is the other element. Strips 56 and 52 form a sensitive automatic switch in a low voltage electric circuit including coil 50, terminal 54, and a second terminal post 58 to which one end of strip 56 is pivotally secured.

The temperature which is maintained in vaporizer 44 controls the amount of vapor admixed with the flue gas stream flowing toward the pump 40. The spring strip 56 is hung so that its free contact end 59 tends to hold contact with bimetallic strip 52 above the maximum vaporizing temperature at which it is desired to operate vaporizer 44, while bimetallic strip 52 is calibrated so that its free contact end tends to warp away from the contact end 59 of strip 56 when the temperature developed by the vaporizer heating circuit exceeds a predetermined amount. An adjustment screw 60 is provided with an insulated end 61, whereby the free end of strip 56 is prevented from moving in the direction of warp of strip 52 when the vaporizer temperature exceeds that at which the switch is designed to break circuit.

Pump 40 is a rotary pump mounted on the drive shaft of a small constant speed electric motor 62 which is powered by current flowing through an electric circuit 64 and controlled by a panel mounted switch 66. The discharge outlet of pump 40 is permanently connected by a conduit 72 to an orifice block 68 which is mounted at the base of an analyzer cell casing 70. The sample of flue gas or flue gas-fuel vapor mixture passes from pump 40 through conduit 72 into and through a calibrated orifice 69 in block 68. After passing orifice 69 the gas enters a short manifold 73 in which a constant pressure is maintained by a pressure relief valve 74 which may be of any well known type, a preferred type being a weighted ball valve capable of holding a constant back pressure of about 10 inches of water against escape of gas from manifold 73 to atmosphere. From manifold 73 the gas sample to be tested for its content of unburned combustible or excess air flows to one cell 82 of the two-cell analyzer through passage 76.

Analyzer 70 is supported upon orifice block 68 as a base, and embodies a pair of hollow tubular members 78 of molded bakelite or the like extending upwardly from block 68. Members 78 extend upwardly into the lower part of a pair of tubular cells 80, 82 within the body of the analyzer. Each of the members 78 carries a catalytic heating element or ribbon 77, preferably in the nature of a platinum ribbon, arranged in the form of an elongated loop supported by members 78 in the path of gas and air in cells 80, 82, respectively. The lead wires from the heating ribbon 77 may be molded within members 78 and connected to contact posts 86, 88 and 90, 92 respectively extending through the sides of the respective heater mounting members 78. Members 78 may be secured to the body portion of analyzer 70 by bolts 83, 84. The cell 80 is closed at its upper and lower ends, while cell 82 is open to atmosphere through an aperture 94.

Heating elements 77 are energized from the secondary coil of a transformer 96 from which current is conducted to elements 77 by wires 97 and 98 connected respectively to posts 86 and 92. A variable resistance is connected to wire 97 in the form of an amperite 100 which is adapted to compensate for slight variations in the current flowing in the primary coil of transformer 96. The primary coil of transformer 96 is energized from the main circuit 64 when the switch 66 is adjusted to operate motor 62.

For measuring heat changes in the catalytic heater ribbons 77 caused by the reactions occurring thereon, a thermopile is provided in the form of a differential thermocouple comprising a series of thermocouple elements closely grouped together and molded in a supporting block 102. The thermopile preferably comprises 6 or more cold thermocouple junctions 104 mounted in closely grouped aligned relation at one end of the catalytic heating ribbon 77 in the sealed cell 80 of the analyzer, and a corresponding series of hot junctions 106 mounted in like relation to heating ribbon 77 in analyzer cell 82. The junctions 104 and 106 are disposed in cells 80 and 82, with relation to the heating ribbon 77, so that each junction is exposed to substantially the same amount of heat as the other junctions of the set, and the heat shielding effect of each thermocouple junction for the others of that set is minimized. The leads of the thermocouple junctions which are embedded in member 102 are preferably slightly oxidized to insure their thorough insulation from one another with the very small current flowing therethrough. The series of thermocouples 104 and 106 is connected with a galvanometer 108 through lead wires 109 and 110. Operatively interposed between the galvanometer and the lead wire 110 is a switch 112 and resistance 114. A lever 115 is mounted on the actuating shaft 36 of valve 34 in position to throw switch 112 into closed position to complete direct circuit connection between wire 110 and the galvanometer and short circuit resistance 114 with valve 34 in the position illustrated in Fig. 5; while turning valve 34 to connect the vaporizer 44 into the gas circuit feeding the analyzer actuates switch 112 to open position thus throwing resistance 114 into the thermocouple circuit including wire 110 and galvanometer 108.

The galvanometer 108 is mounted on the instrument panel and is provided with two scales calibrated respectively for temperature readings indicating small percentages of combustible in the flue gas on the one scale, and large percentages of excess air or oxygen on the other scale. The resistance 114 is calibrated for reducing the potential developed in the thermocouples by combustion of a large excess of air (say up to 100 per cent) passed through the analyzer cell 82 by an amount which will bring the reading within the dial of galvanometer 108, with the galvanometer calibrated to accurately measure temperatures developed by small amounts (say under 2½ per cent) of combustible in the flue gas sample.

For varying the current flowing through the circuit supplying the electric heating element 77 to permit an adjustment of the needle of galvanometer 108 to zero position, a variable resistance 116 may preferably be built into the back of the analyzer casing. While not shown in detail, this resistance may comprise essentially a sliding contact member 117 controlled by a knob 118 and in constant electric contact with post 88. Terminal post 86 is in turn in permanent electric contact with an annular resistance coil 119, and the resistance in the heating circuit is varied by turning the knob 118 and shifting the point of contact of the contact member with the annular resistance. This controls the amount of current flowing through the respective heater elements 77. Terminal posts 88 and 90 are permanently connected by a strip 120 (Fig. 4).

In the ordinary practice of the invention in connection with the form of apparatus shown, the instrument is plugged in at socket 121 to a source of 110 volt A. C. current. The switch 66 is closed, which simultaneously energizes motor 62 and induces flow of low potential current to the heater wires 77 from transformer 96, and to the heating coil 50 of vaporizer 44 from transformer 122 (Fig. 4). With the amperite 100 in place and the reservoir 46 filled with a suitable carbureting fuel, the lever 38 is turned to place the vaporizer 44 in operative circuit with the sampling pipe 16 and the analyzer chamber 82. With the sampling tube 16 in the air so that pure air is passed to the analyzer through the vaporizer 44, the adjustment screw 60 on the vaporizer is turned until the indicator pointer of galvanometer 108 remains on the galvanometer scale at about the maximum swing from the zero position of the scale. The lever 38 is then switched to the position for analyzing for combustibles, with the vaporizer 44 cut out of the gas circuit. This short circuits resistance 114, and the indicator needle of galvanometer 108 swings to the left toward zero position. If the indicator pointer does not return to the zero position, it should be adjusted by the variable resistance 116 until it is at zero position.

After making the above check adjustments on the instrument, it is ready for making excess air and combustible determinations on the flue gas of the furnace or Diesel engine to be examined. The sampling tube 16 is placed in the flue 17 of the furnace (Fig. 4) and with the changeover lever 38 in position for analyzing for excess air (with the vaporizer 44 in the gas circuit to the analyzer) a continuous sample of the flue gas is drawn at a substantially uniform rate through the scrubber 28, filter 30, and vaporizer 44, into pump 40, and a continuous sample of the gas admixed with vaporized fuel from the vaporizer is forced by the pump into analyzer cell 82. The gas vapor mixture enters the analyzer under a constant pressure and at a constant rate. The gas sample vapor stream passes into chamber 82 and all the excess air is burned therein, after which the gas exhausts through passage 94. The comparator cell 80 is a sealed cell preferably filled with air or with other suitable comparison fluid such as hydrogen or carbon dioxide. The catalytic combustion which occurs in cell 82 increases the temperature of the hot thermojunctions 106 therein, developing a small electromotive force in the latter. Since no combustion occurs in cell 80 during this time, the temperature of the heating element 77 therein remains constant. The increased temperature developed at the heating element 77 in chamber 82 is then measured on the excess air scale of the galvanometer 108 in terms of percentage excess air in the flue gases. The change-over lever 38 is then turned to the position for analyzing combustible, throwing vaporizer 44 out of circuit and short-circuiting resistance 114. The analyzer is operated for a sufficient length of time to secure a reading on the scale of galvanometer 108 showing the percentage of unburned combustible in the flue gas. The analysis of the flue gas sample for "excess air" should be made first in order to be sure that the gas sample carries enough excess air to burn the amount of combustible which the instrument is calibrated to handle, as for example up to 2.3 per cent unburned combustible.

The heating current flowing through the respective heating elements 77 is adjusted to maintain these elements at a selected temperature, preferably of about 1000° F. to 1200° F., when in a flowing stream of air. It has been discovered that by operating these heating elements at a temperature above 1000° F., the catalytic properties are permanently maintained. Operating temperatures substantially above 1200° should be avoided because of the danger that excessive temperatures resulting from catalytic combustion of the air-fuel mixture may cause destruction or injury to the catalytic elements and thermocouples. The variable resistance 116 on the back of the instrument can be stepped up to increase the temperature of the heating element 77 for brief periods, for the purpose of reactivating the catalytic elements in the presence of a flowing stream of air.

In the practice of the invention the preferred carbureting fluid which is added to the flue gas stream in the vaporizer 44 consists of a mixture of equal volumes of methanol and ethyl acetate. This carbureting mixture has a relatively low heat of combustion below 6000 gram calories per gram, and it has been found that by maintaining the vaporizer 44 during operation at a constant predetermined temperature of 106° F., the methanol and ethyl acetate components of the carbureting mixture evaporate at an equal rate, so that the supply of heating units which is added to the flue gas stream flowing through the vaporizer is maintained constant from the time that the reservoir 46 is filled until the time it empties. This is a very important feature of the invention whereby accurate readings are obtained of the amount of excess air carried by the flue gas sample. The specific mixture of methanol and ethyl acetate referred to develops temperatures on combustion which are not so high as to make it difficult to secure accurate quantitative measurements of excess air in proportions up to 100 per cent by volume of the flue gas. In place of the preferred methanol-ethyl acetate mixture, however, straight methanol has been found to be a satisfactory fuel for use in measuring excess air contents of flue gas not exceeding 50 per cent by volume of the gas. Acetone has been found to be a satisfactory carbureting fuel for measuring up to 100 per cent excess air by volume of the flue gas. Likewise ethyl acetate may be used as fuel for measuring the excess air content of flue gas up to 200 per cent by volume of the gas, providing that the resistance 114 in the thermocouple circuit is calibrated to bring the potential of the current developed in the circuit within the scale of the galvanometer 108.

With any of the named carbureting fuels, the vaporizer will operate satisfactorily at a predetermined temperature in the range 90° F.–115° F. when flowing unheated gas through the vaporizer at a rate of 50–100 cubic inches per minute over an exposed wick surface not substantially exceeding one square inch in area.

The thermocouple 20 which is used with the thermometer 24 may be of the Chromel-Copel type calibrated for a cold junction reading at 75° F. The type of thermocouple used in the analyzer of course depends on the optimum temperature at which it is desired to operate the analyzer.

The invention is obviously susceptible of modification within the scope of the appended claims.

The invention having been thus described, what is claimed as new is:

1. In checking the efficiency of a combustion and heating operation, the steps comprising, continuously removing a sample stream of flue gas produced in the operation, measuring the temperature of the flue gas at the point at which the sample is removed, periodically vaporizing a liquid fuel comprising equal parts by volume of methanol and ethyl acetate at a temperature of about 106° F., and adding the vaporized fuel to the sample of the flue gas stream, determining by quantitative combustion analysis of the flue-gas-fuel-vapor mixture the amount of excess air originally present in the flue gas sample, and periodically discontinuing the fuel vaporizing operation and determining by quantitative combustion analysis of the flue gas sample the amount of unburned combustible originally carried thereby.

2. In checking the efficiency of a combustion operation, the steps comprising, withdrawing a sample stream of flue gas and quantitatively analyzing the sample for excess air by vaporizing at a predetermined fixed rate a liquid partially oxidized hydrocarbon having a calorific value within the range 5600–7600 gram calories per gram, adding the vapors to the flue gas sample, and determining by measurement of the temperature developed on combustion of the gas-vapor mixture in contact with a heated catalyst, the amount of excess air originally present in the flue gas sample.

3. In checking the efficiency of a combustion operation, the steps comprising, withdrawing a measured sample stream of flue gas and quantitatively analyzing the sample for excess air by vaporizing methanol at a predetermined rate, adding the vapors to the flue gas sample, and determining by measurement of the temperature developed on combustion of the gas-vapor mixture in contact with a heated catalyst, the amount of excess air originally present in the flue gas sample.

4. In checking the efficiency of a combustion operation the steps comprising, withdrawing a measured sample stream of flue gas and quantitatively analyzing the sample for excess air by vaporizing a liquid partially oxidized hydrocarbon fuel of about 6000–7000 gram calories per gram heating value at a constant temperature in the range 90° F.–115° F. adding the vapors to the flue gas sample, and determining by measurement of the temperature developed on combustion of the gas-vapor mixture in contact with a heated catalyst, the amount of excess air originally present in the flue gas sample.

5. In checking the efficiency of a combustion operation the steps comprising, withdrawing a measured sample stream of flue gas and quantitatively analyzing the sample for excess air by vaporizing ethyl acetate at a constant temperature in the range 90° F.–115° F., adding the vapors to the flue gas sample, and determining by measurement of the temperature developed on combustion of the gas-vapor mixture in contact with a heated catalyst, the amount of excess air originally present in the flue gas sample.

6. In checking the efficiency of a combustion operation the steps comprising continuously withdrawing a sample stream of flue gas, periodically adding thereto at a predetermined constant rate vapors of a liquid partially oxidized hydrocarbon having a calorific value of about 6000 gram calories per gram, passing the gas-vapor mixture at a uniform rate over a heating element maintained at a temperature above 1000° F., producing an electromotive force by the resultant heat developed adjacent the heating element, measuring the electromotive force produced, discontinuing the addition of vapor to the flue-gas stream while continuing to pass it over the heating element, and again measuring the electromotive force produced by heat developed by combustion adjacent said heating element.

7. Apparatus adapted for quantitatively analyzing flue gas by combustion, comprising a gas analyzer including a combustion cell, a catalytic heating element mounted in such cell, means for supplying electric current at a controlled rate to the catalytic heating element, mechanism operatively connected to the analyzer for measuring the temperature developed in such cell, a gas sampler communicably connected to the analyzer for taking a sample stream of flue gas and passing it continuously at a controlled rate and pressure through the combustion cell, a vaporizer including a heater operatively connected to the gas sampler and adapted for vaporizing liquid fuel and adding the vapors to the flue gas stream on its way to the analyzer, a thermostat for regulating the operation of the vaporizer heater to a predetermined slow uniform rate, and a by-pass valve and connections whereby operative connection of the vaporizor with the analyzer can be made and broken while maintaining continuous connection between the sampler and the analyzer.

8. Apparatus for checking the efficiency of a combustion operation comprising, a gas analyzer cell and a closed comparator cell in a unitary structure, a catalytic heating element in each cell, a thermopile operatively connected to said structure for measuring the temperature developed therein, a gas sampler communicably connected to the analyzer cell for removing a sample stream of flue gas and passing it at a regulated rate and pressure through the analyzer cell, means for flowing a regulated electric current through the said heating elements, a vaporizer operatively connected to the gas sampler and adapted for vaporizing liquid fuel and adding the vapors to the flue gas stream on its way to the analyzer, means for regulating the operation of the vaporizer to a predetermined slow uniform rate, and a bypass valve and connections whereby operative connection of the vaporizer with the analyzer can be made and broken without breaking the connection between the sampler and the analyzer, said thermopile comprising a plurality of interconnected hot and cold thermocouple junctions mounted respectively in the gas analyzer cell and in the comparator cell and connected in a closed circuit with a milli-voltmeter, and a switch operatively connected with said bypass valve for actuation therewith, said switch being connected in circuit with the thermopile and with a resistance element whereby the potential developed by the thermopile can be adjusted in accordance with the temperature developed in the analyzer cell.

9. In checking the efficiency of a combustion operation, the steps comprising withdrawing a sample stream of flue gas, quantitatively analyzing the sample for excess air by vaporizing at a predetermined fixed rate a liquid partially oxidized hydrocarbon having a calorific value within the range 5600–7600 gram calories per gram, adding the vapors to the flue gas sample and determining by a measurement of the temperature developed on combustion of the gas vapor mixture the amount of air originally present in the flue gas sample, discontinuing the addition of vapor to the flue gas sample and determining by quantitative combustion analysis of the flue gas sample the amount of unburned combustible originally carried thereby.

JOHN D. MORGAN.
ALAN P. SULLIVAN.